United States Patent
Takamiya

(10) Patent No.: US 10,161,321 B2
(45) Date of Patent: Dec. 25, 2018

(54) CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventor: Fumio Takamiya, Gotemba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 284 days.

(21) Appl. No.: 15/264,115

(22) Filed: Sep. 13, 2016

(65) Prior Publication Data
US 2017/0074204 A1 Mar. 16, 2017

(30) Foreign Application Priority Data
Sep. 15, 2015 (JP) ................................. 2015-182182

(51) Int. Cl.
*F02D 41/00* (2006.01)
*F02D 41/30* (2006.01)
(Continued)

(52) U.S. Cl.
CPC ............ *F02D 41/0007* (2013.01); *F01L 9/04* (2013.01); *F02B 37/18* (2013.01); *F02B 37/183* (2013.01);
(Continued)

(58) Field of Classification Search
CPC ............... F02D 41/0007; F02D 41/307; F02D 41/1475; F02D 13/0242; F02D 13/0246;
(Continued)

(56) References Cited

U.S. PATENT DOCUMENTS

2008/0077304 A1* 3/2008 Suzuki ............... F02B 37/013
701/102
2009/0173062 A1* 7/2009 Hu .......................... F01N 3/023
60/295
(Continued)

FOREIGN PATENT DOCUMENTS

DE 102007000088 A1 * 8/2007 ......... F02D 41/0007
JP 2002364412 A * 12/2002 ............. F02D 41/04
(Continued)

Primary Examiner — Thai Ba Trieu
Assistant Examiner — Jessica Kebea
(74) Attorney, Agent, or Firm — Hunton Andrews Kurth LLP

(57) ABSTRACT

A control apparatus for an internal combustion engine is configured to: open a waste gate valve if switching operation modes from supercharged lean burn operation to stoichiometric burn operation and if it is necessary to decrease an air amount; control an exhaust variable valve train so that, during a response delay period accompanying the waste gate valve being opened, a first valve opening period EX1 and a second valve opening period EX2 are set and the second valve opening period overlaps with a valve opening period IN; control a fuel injection valve so as to inject fuel of an amount necessary to realize the stoichiometric air-fuel ratio under a stoichiometric requested air amount during the response delay period; and control the second valve opening period EX2 of the exhaust valve so that, during the response delay period, the air amount comes close to the requested air amount.

1 Claim, 7 Drawing Sheets

(51) Int. Cl.
*F02D 41/40* (2006.01)
*F02D 13/02* (2006.01)
*F02D 23/02* (2006.01)
*F02B 37/18* (2006.01)
*F02B 37/02* (2006.01)
*F01L 9/04* (2006.01)
*F01L 1/356* (2006.01)
*F02P 5/04* (2006.01)
*F02D 37/02* (2006.01)

(52) U.S. Cl.
CPC ..... *F02D 13/0242* (2013.01); *F02D 13/0246* (2013.01); *F02D 13/0261* (2013.01); *F02D 13/0273* (2013.01); *F02D 23/02* (2013.01); *F02D 41/006* (2013.01); *F02D 41/307* (2013.01); *F01L 1/356* (2013.01); *F01L 2009/0407* (2013.01); *F01L 2009/0411* (2013.01); *F02D 37/02* (2013.01); *F02D 41/401* (2013.01); *F02D 2041/001* (2013.01); *F02D 2250/21* (2013.01); *F02P 5/045* (2013.01); *Y02T 10/144* (2013.01); *Y02T 10/18* (2013.01); *Y02T 10/47* (2013.01)

(58) Field of Classification Search
CPC .. F02D 13/0249; F02D 13/0273; F02D 23/00; F02D 23/02; F02D 2041/001; F02D 2250/21; F02B 37/18; F02B 37/183
See application file for complete search history.

(56) References Cited

U.S. PATENT DOCUMENTS

| | | | |
|---|---|---|---|
| 2010/0071658 A1* | 3/2010 | Soejima | F01N 3/0842 123/406.19 |
| 2011/0126519 A1* | 6/2011 | Okada | F02D 13/0246 60/276 |
| 2015/0167578 A1* | 6/2015 | Hotta | F02D 41/3035 701/104 |
| 2016/0273494 A1* | 9/2016 | Hotta | F02M 25/0836 |
| 2017/0089284 A1* | 3/2017 | Miura | F01N 3/20 |
| 2017/0363020 A1* | 12/2017 | Okada | F01L 1/047 |

FOREIGN PATENT DOCUMENTS

| | | |
|---|---|---|
| JP | 2005-351145 A | 12/2005 |
| JP | 2009-174432 A | 8/2009 |
| JP | 2009-209903 A | 9/2009 |

* cited by examiner

Normal rotation drive mode          Oscillation drive mode

CONTROL APPARATUS FOR INTERNAL COMBUSTION ENGINE

CROSS-REFERENCE TO RELATED APPLICATION

The present application claims priority to Japanese Patent Application No. 2015-182182 filed on Sep. 15, 2015, which is incorporated herein by reference in its entirety.

BACKGROUND

Technical Field

Embodiments of the present disclosure relate to a control apparatus for an internal combustion engine, and more particularly to a control apparatus for controlling an internal combustion engine that performs switching of operation modes between stoichiometric burn operation that uses a stoichiometric air-fuel ratio and lean burn operation that uses a lean air-fuel ratio that is greater than the stoichiometric air-fuel ratio.

Background Art

In Japanese Patent Laid-Open No. 2009-209903, a control apparatus for an internal combustion engine is disclosed that performs switching of operation modes between stoichiometric burn operation and lean burn operation. According to this control apparatus, during a period in which a difference between an actual intake air amount and an intake air amount requested in the stoichiometric burn operation is equal to or greater than a predetermined threshold value at a time of the switching from the lean burn operation to the stoichiometric burn operation, fuel of an amount that is in accordance with the actual intake air amount is injected so that the stoichiometric air-fuel ratio is obtained, and retardation of the spark timing is also performed to suppress the occurrence of a torque level difference accompanying the switching of the operation modes.

Following is a list of patent documents which may be related to the present disclosure.
[Patent Document 1]
 JP 2009-209903 A
[Patent Literature 2]
 JP 2009-174432 A
[Patent Literature 3]
 JP 2005-351145 A Technical Problem An internal combustion engine is known which includes a turbo-supercharger and a waste gate valve configured to open and close an exhaust bypass passage bypassing a turbine of the turbo-supercharger, and which is configured to control supercharging pressure by adjusting the opening degree of the waste gate valve. According to the internal combustion engine having this configuration, the supercharging pressure can be increased by closing the waste gate valve. The following is an issue assumed when the operation mode is switched from the lean burn operation to the stoichiometric burn operation under a situation where the lean burn operation is being executed in a supercharging region in which supercharging is performed by the turbo-supercharger. Here, the lean burn operation performed in the supercharging region is referred to as a "supercharged lean burn operation".

An air amount required to generate, under the stoichiometric air-fuel ratio, the same torque as a torque that is generated under a lean air-fuel ratio that is greater than the stoichiometric air-fuel ratio is less than an air amount required when the lean air-fuel ratio is used. Accordingly, in order to suppress the occurrence of a torque level difference at a time of the switching of the operation modes from the supercharged lean burn operation to the stoichiometric burn operation, with some exceptions, it is necessary to decrease the air amount accompanying the switching of the operation modes. Further, at a time of this kind of switching, it is necessary to open a waste gate valve to decrease the air amount. This is because, when the waste gate valve is opened, the supercharging pressure (outlet pressure of the compressor) drops, and, as a result, the in-cylinder air amount decreases because of a decrease in the intake port pressure. However, even if the waste gate valve is opened, it takes time until the intake port pressure decreases as far as a value (that is, a requested intake port pressure) necessary to cause the in-cylinder air amount to be a requested air amount in the stoichiometric burn operation after the switching. Therefore, at a time of switching in the manner described above, the in-cylinder air amount becomes excessive relative to the requested air amount during an intake-port-pressure decreasing period during which the intake port pressure decreases accompanying opening of the waste gate valve.

Where applying the technique described in the aforementioned Japanese Patent Laid-Open No. 2009-209903 to the switching of the operation modes from supercharged lean burn operation to stoichiometric burn operation, during the aforementioned intake-port-pressure decreasing period, fuel of an amount that is in accordance with the actual air amount is injected so that the stoichiometric air-fuel ratio is obtained that is a requested air-fuel ratio for after the switching. As a result, the fuel efficiency deteriorates. Further, in the technique described in Japanese Patent Laid-Open No. 2009-209903, it is necessary to rely significantly on retardation of the spark timing to suppress the occurrence of a torque level difference. Therefore, in this respect, the fuel consumption also deteriorates and a deterioration in combustion and torque fluctuations accompanying the deterioration in combustion may also arise.

On the other hand, in order to avoid executing the above described retardation of the spark timing, a fuel injection amount can be adjusted during an intake-port-pressure decreasing period so as to come close to an amount with which the target torque can be realized under the actual air amount. However, if this technique is used, the air-fuel ratio during the intake-port-pressure decreasing period gradually changes toward the stoichiometric air-fuel ratio accompanying a decrease in the air amount. The amount of NOx emissions from inside a cylinder increases in an air-fuel ratio region that is a little leaner than the stoichiometric air-fuel ratio. Consequently, if this technique is used, there is a concern that the NOx emissions amount will increase when combustion is performed using the aforementioned air-fuel ratio region in the course of the air-fuel ratio changing.

Based on the foregoing, with respect to the switching from supercharged lean burn operation to stoichiometric burn operation, it can be said that an essential issue to satisfy the three requirements of suppressing a torque level difference, avoiding (or at least suppressing) retardation of the spark timing, and suppressing the amount of NOx emissions is that the in-cylinder air amount cannot be rapidly brought close to a requested air amount due to a response delay of the intake port pressure accompanying opening of the waste gate valve.

SUMMARY

Embodiments of the present disclosure address the above-described problem and have an object to provide a control apparatus for an internal combustion engine configured so that, at a time of switching operation modes from supercharged lean burn operation to stoichiometric burn operation, an amount of air that is charged into a cylinder is rapidly brought close to a requested air amount for the stoichiometric burn operation.

A control apparatus for controlling an internal combustion engine according to embodiments of the present disclosure is configured to control an internal combustion engine that includes: a fuel injection valve configured to supply fuel into the internal combustion engine; a turbo-supercharger including a compressor arranged in an intake passage and a turbine arranged in an exhaust passage; a waste gate valve configured to open and close an exhaust bypass passage that bypasses the turbine; an intake port being one part of the intake passage; an exhaust port being one part of the exhaust passage; and a valve train configured to drive an intake valve that opens and closes the intake port and an exhaust valve that opens and closes the exhaust port. One or a plurality of the exhaust valves are provided with respect to one cylinder. The valve train includes an exhaust variable valve train. The exhaust variable valve train is configured to: set, as valve opening periods of the one or plurality of exhaust valves, a first valve opening period that includes an exhaust stroke and adopts exhaust top dead center as an end point and a second valve opening period in which one or all of the one or plurality of exhaust valves are opened and closed during an intake stroke that follows the exhaust stroke; and change valve opening characteristics of the one or all of the one or plurality of exhaust valves in the second valve opening period. The control apparatus includes a controller. The controller is programmed to: open the waste gate valve if switching of operation modes is performed from supercharged lean burn operation in which combustion is performed at a lean air-fuel ratio greater than a stoichiometric air-fuel ratio with supercharging of intake air by the turbo-supercharger to stoichiometric burn operation in which combustion is performed at the stoichiometric air-fuel ratio, and if a requested air amount for the stoichiometric burn operation performed after the switching is less than a requested air amount for the supercharged lean burn operation performed before the switching; control the exhaust variable valve train so that, during an intake-port-pressure decreasing period in which intake port pressure decreases accompanying opening the waste gate valve, the first valve opening period and the second valve opening period are set and at least a part of the second valve opening period overlaps with a valve opening period of the intake valve that opens at or after the exhaust top dead center in an intake stroke; control the fuel injection valve during the intake-port-pressure decreasing period so as to inject fuel of an amount required for realizing the stoichiometric air-fuel ratio under a requested air amount for the stoichiometric burn operation performed after the switching of the operation modes; and control the valve opening characteristics of the one or all of the one or plurality of exhaust valves that open and close in the second valve opening period so that, during the intake-port-pressure decreasing period, an amount of air charged into a cylinder comes close to the requested air amount.

According to embodiments of the present disclosure, if switching of operation modes from supercharged lean burn operation to stoichiometric burn operation is performed and if it is necessary to decrease an air amount in a cylinder, an exhaust variable valve train is controlled so that, during an intake-port-pressure decreasing period, a first valve opening period that adopts the exhaust top dead center as an end point and a second valve opening period in which an exhaust valve opens and closes in an intake stroke are set, and so that at least a part of the second valve opening period overlaps with a valve opening period of an intake valve that opens at or after the exhaust top dead center in an intake stroke. Further, during the intake-port-pressure decreasing period, valve opening characteristics of the exhaust valve that opens and closes in the second valve opening period are controlled so that an amount of air charged into a cylinder comes close to a requested air amount for the stoichiometric burn operation performed after the switching. Thus, the amount of air charged into the cylinder can be rapidly brought close to the aforementioned requested air amount by utilizing an inflow of EGR gas during the intake stroke, while suppressing, in the vicinity of the exhaust top dead center, the occurrence of blow-through of gas (fresh air or an air-fuel mixture) to an exhaust port from an intake port through the combustion chamber. As a result, it is possible to rapidly switch the operation modes from the supercharged lean burn operation to the stoichiometric burn operation.

DETAILED DESCRIPTION

First Embodiment

First, a first embodiment of the present disclosure will be described with reference to FIG. 1 to FIG. 11.
[Configuration of System of First Embodiment]
(Overall Configuration of System)

Figure 1:
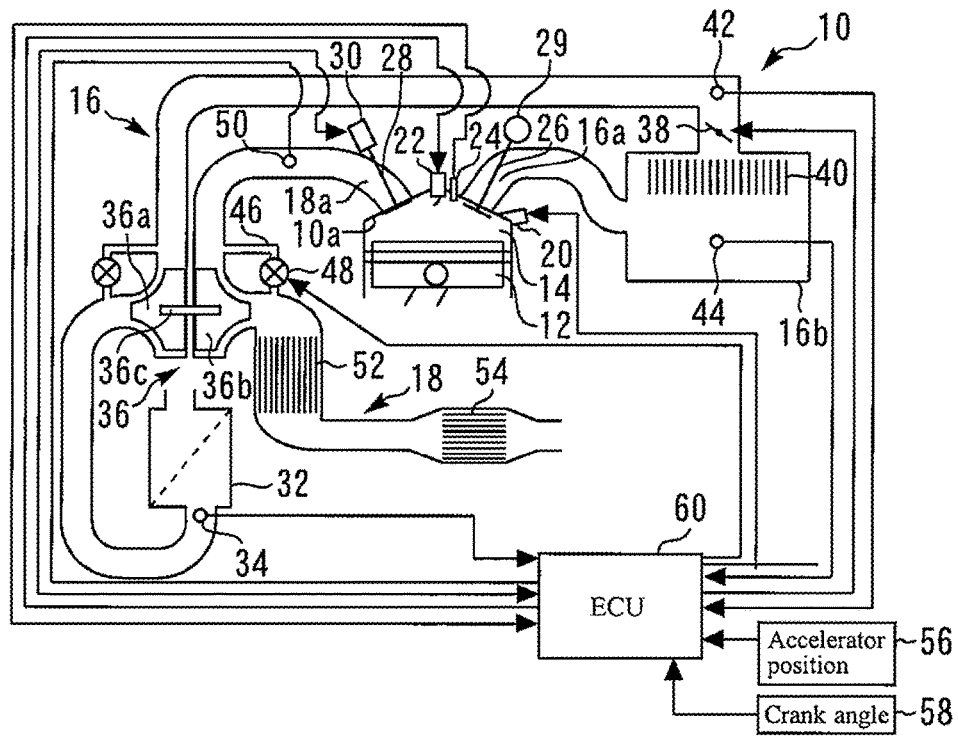
FIG. 1 is a view for schematically illustrating a system configuration of an internal combustion engine according to a first embodiment of the present disclosure.

FIG. 1 is a view for schematically illustrating a system configuration of an internal combustion engine 10 according to the first embodiment of the present disclosure. The internal combustion engine 10 illustrated in FIG. 1 is a spark-ignition type engine (as one example, a gasoline engine) that is mounted in a vehicle to be used as a power source of the vehicle. Although, as one example, the internal combustion engine 10 is an in-line four-cylinder engine, the number of cylinders and cylinder arrangement of an internal combustion engine that is an object of the present disclosure is not particularly limited.

A piston 12 that performs a reciprocating motion inside a cylinder is arranged inside each cylinder of the internal combustion engine 10. A space that is enclosed by the piston 12 and a cylinder head 10a serves as a combustion chamber 14. An intake port 16a of an intake passage 16 and an exhaust port 18a of an exhaust passage 18 communicate with the combustion chamber 14. Each cylinder includes a fuel injection valve 20 that directly injects fuel into the combustion chamber 14, and a spark plug 22 for igniting an air-fuel mixture inside the combustion chamber 14. A fuel injection valve that injects fuel into the respective intake ports 16a may be used instead of, or together with, the fuel injection valve 20 as a fuel injection valve that supplies fuel into the combustion chamber 14. An in-cylinder pressure sensor 24 for detecting an in-cylinder pressure is arranged in each cylinder.

The intake port 16a is opened and closed by an intake valve 26. The exhaust port 18a is opened and closed by an exhaust valve 28. As one example, the internal combustion engine 10 includes two intake valves 26 and two exhaust valves 28 in each cylinder. The internal combustion engine 10 includes valve trains for driving the intake valves 26 and exhaust valves 28 to open and close. The valve trains include an intake valve train 29 that drives the intake valve 26 to open and close, and an exhaust variable valve train 30 that is configured to change valve opening characteristics of the exhaust valve 28. A specific configuration of the exhaust variable valve train 30 will be described later referring to FIG. 2.

An air cleaner 32 is provided in the vicinity of an inlet of the intake passage 16. An air flow sensor 34 that outputs a signal in accordance with a flow rate of air that is drawn into the intake passage 16 is provided in the air cleaner 32. A compressor 36a of a turbo-supercharger 36 for supercharging intake air is arranged in the intake passage 16 on a downstream side relative to the air cleaner 32. The turbo-supercharger 36 includes a turbine 36b provided in the exhaust passage 18 and configured to operate by means of exhaust energy of exhaust gas. The compressor 36a is integrally connected to the turbine 36b through a connecting shaft 36c, and is rotationally driven by exhaust energy of exhaust gas that enters the turbine 36b.

An electronically controlled throttle valve 38 that opens and closes the intake passage 16 is arranged in the intake passage 16 on the downstream side relative to the compressor 36a. A part of the intake passage 16 that is on the downstream side relative to the throttle valve 38 is configured as an intake manifold 16b. Intake air is distributed to the respective cylinders through the intake manifold 16b. An intercooler 40 for cooling intake air compressed by the compressor 36a is arranged at a convergence part (surge tank) of the intake manifold 16b. A first intake air pressure sensor 42 for detecting a supercharging pressure (outlet pressure of the compressor 36a) is arranged between the compressor 36a and the throttle valve 38 in the intake passage 16. Further, a second intake air pressure sensor 44 for detecting an intake manifold pressure (intake port pressure) Pim is arranged in the intake manifold 16b.

An exhaust bypass passage 46 that bypasses the turbine 36b is connected to the exhaust passage 18. A waste gate valve (WGV) 48 is arranged in the exhaust bypass passage 46 as a bypass valve that opens and closes the exhaust bypass passage 46. As one example, the WGV 48 is an electric motor-driven valve, and is configured to be adjustable to an arbitrary opening degree within a predetermined opening degree control range. By changing the opening degree of the WGV 48, the amount of exhaust energy that the turbine 36b recovers can be adjusted to thereby control the driving force of the compressor 36a.

An air-fuel ratio sensor 50 that outputs a signal that changes linearly with respect to an air-fuel ratio of exhaust gas is arranged in the exhaust passage 18 on the upstream side relative to the turbine 36b. An exhaust purification apparatus for purifying exhaust gas is arranged in the exhaust passage 18 on the downstream side relative to the air-fuel ratio sensor 50. Specifically, as one example, a three-way catalyst 52 and an NSR catalyst (storage-reduction type NOx catalyst) 54 are arranged in the exhaust passage 18 in this order from the upstream side of the exhaust gas.

The system of the present embodiment also has an accelerator position sensor 56 for detecting a depression amount (accelerator position) of an accelerator pedal of the vehicle in which the internal combustion engine 10 is mounted, and a crank angle sensor 58 for detecting a crank angle and an engine speed. In addition to these sensors, various other sensors that are not illustrated in the drawings are also provided in the present system.

The system shown in FIG. 1 includes an electronic control unit (ECU) 60. The various sensors and actuators described above are electrically connected to the ECU 60. The ECU 60 performs control of the overall system shown in FIG. 1, and includes as a main constituent a computer that includes a CPU and a memory. Various control programs and maps for controlling the internal combustion engine 10 are stored in the memory. The ECU 60 controls operation of the internal combustion engine 10 by executing these control programs and driving the actuators based on signals from the sensors.
(Configuration of Exhaust Variable Valve Train According to First Embodiment)

Figure 2:
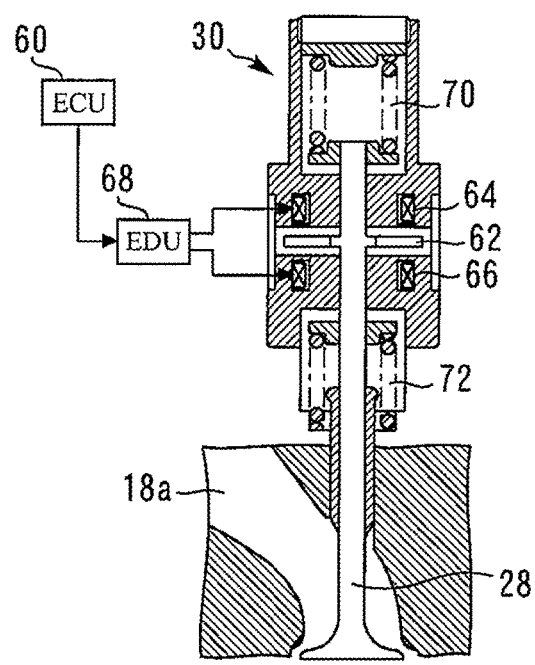
FIG. 2 is a view illustrating a schematic configuration of an exhaust variable valve train shown in FIG. 1.

FIG. 2 is a view illustrating a schematic configuration of the exhaust variable valve train 30 shown in FIG. 1. The exhaust variable valve train 30 is a known type that drives the exhaust valve 28 using an electromagnetic force. The exhaust variable valve train 30 includes an armature 62 that is fixed to a valve shaft of the exhaust valve 28, and a pair of electromagnets 64 and 66 that are arranged so as to be separated by a predetermined distance in a state in which the armature 62 is interposed therebetween. The predetermined distance corresponds to a maximum lift amount (a peak value of a lift amount during a single lift operation) of the exhaust valve 28.

The pair of electromagnets 64 and 66 are electrically connected to an electric drive unit (EDU) 68. The EDU 68 controls energization of the electromagnets 64 and 66 based on an instruction from the ECU 60. Further, the exhaust valve 28 is urged in both of an opening direction and a closing direction by a pair of springs 70 and 72. Spring forces of these springs 70 and 72 are adjusted so that, in a state in which energization of the electromagnets 64 and 66 is not being performed, the armature 62 can be positioned at approximately the center of the electromagnets 64 and 66.

According to the exhaust variable valve train 30 having the above described configuration, by controlling energization of the pair of electromagnets 64 and 66, the armature 62 can be caused to reciprocate between the electromagnet 64 and the electromagnet 66, and the exhaust valve 28 can therefore be driven to open and close. More specifically, the exhaust valve 28 can be closed by performing energization of the electromagnet 64 while not performing energization of the electromagnet 66, and the closed valve state can be maintained by maintaining the energization of the electromagnet 64. On the other hand, the exhaust valve 28 can be opened by performing energization of the electromagnet 66 while not performing energization of the electromagnet 64, and the open valve state can be maintained by maintaining the energization of the electromagnet 66. Accordingly, the opening timing and closing timing of the exhaust valve 28 can each be controlled to an arbitrary timing by arbitrarily controlling the energization of the electromagnets 64 and 66. As a result, the operating angle (length of valve opening period) can be continuously and freely controlled, and the number of valve opening periods of the exhaust valve 28 during a single combustion cycle can be set to an arbitrary number. Furthermore, at least one of changing one or both of the opening timing and closing timing, and changing the operating angle in accompaniment therewith with the aforementioned manner corresponds to changing of valve opening characteristics of the exhaust valve 28 by the exhaust variable valve train 30.

[Control in First Embodiment]
(Stoichiometric Burn Operation and Lean Burn Operation)

The internal combustion engine 10 of the present embodiment can switch the operation mode between stoichiometric burn operation and lean burn operation by means of control by the ECU 60. The term "stoichiometric burn operation" used here refers to an operation that is performed while controlling the air-fuel ratio of the air-fuel mixture to the stoichiometric air-fuel ratio. On the other hand, the term "lean burn operation" refers to an operation that is performed while controlling the air-fuel ratio of the air-fuel mixture so as to become a lean air-fuel ratio that is greater than the stoichiometric air-fuel ratio.

Figure 3:
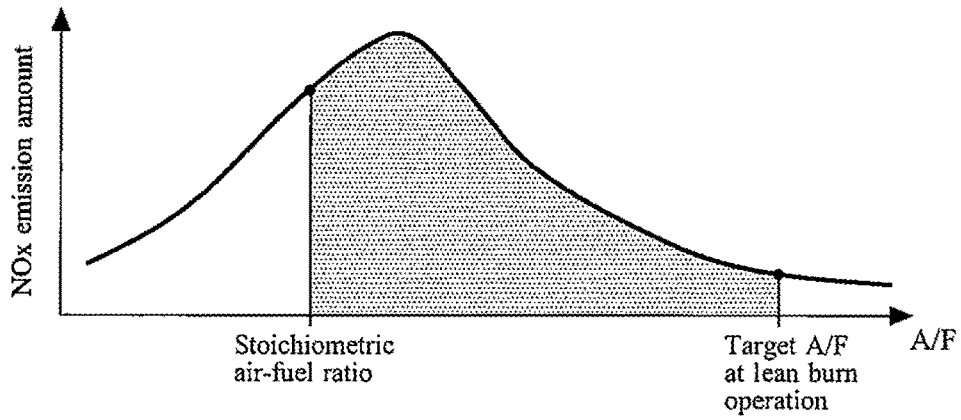
FIG. 3 is a view illustrating a relation between a NOx emissions amount and an air-fuel ratio (A/F)

FIG. 3 is a view illustrating the relation between a NOx emissions amount and the air-fuel ratio (A/F). As shown in FIG. 3, the amount of NOx emissions from the combustion chamber 14 has a characteristic such that amount of NOx emissions reaches a peak at an air-fuel ratio (around 16) that is a little larger than the stoichiometric air-fuel ratio, and after exceeding the peak the amount of emissions decreases as the air-fuel ratio increases. Therefore, as shown in FIG. 3, a target air-fuel ratio in the aforementioned lean burn operation is set so as to be a value at which the NOx emissions amount becomes a sufficiently small level (more specifically, a larger value than a value in an air-fuel ratio range (vicinity of 16 to 20) in which the NOx emissions amount becomes relatively large). However, a lean air-fuel ratio that is an object of the control of the present disclosure is not necessarily limited to an air-fuel ratio according to the above described setting, as long as the air-fuel ratio is a lean air-fuel ratio that is greater than the stoichiometric air-fuel ratio.

Figure 4:
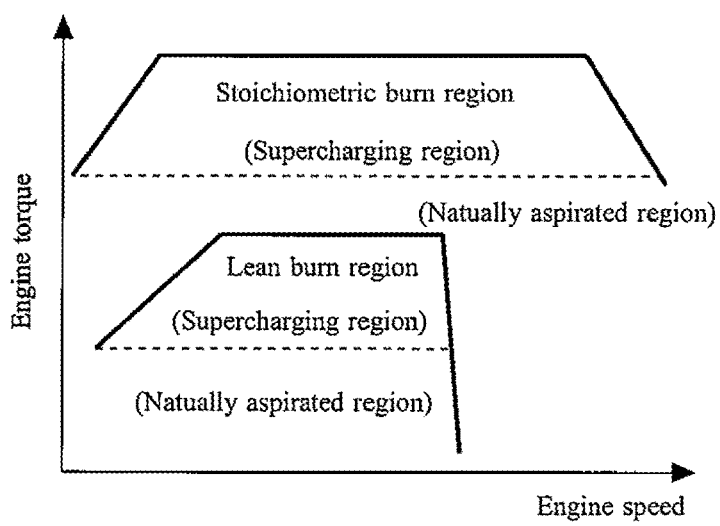
FIG. 4 is a view showing operation regions of an internal combustion engine in which stoichiometric burn operation and lean burn operation are performed.

FIG. 4 shows operation regions of the internal combustion engine 10 in which stoichiometric burn operation and lean burn operation are performed. The operation regions of the internal combustion engine 10 can be defined on a two-dimensional plane that takes the engine torque and the engine speed as axes. In the present embodiment, as one example, as shown in FIG. 4, an operation region on a low-load and low-speed side is a lean burn region in which lean burn operation is performed. An operation region other than the lean burn region is a stoichiometric burn region in which stoichiometric burn operation is performed. With the exception of an exceptional situation such as a time of execution of a rich spike, the operation mode of the internal combustion engine 10 is determined based on the operation regions that are set as shown in FIG. 4.

The stoichiometric burn region and the lean burn region are each separated into a naturally aspirated region and a supercharging region. In the present embodiment, a region in which the intake manifold pressure Pim becomes less than or equal to a reference pressure that is a little lower than atmospheric pressure is referred to as a "naturally aspirated region", and a region in which the intake manifold pressure Pim becomes higher than the reference pressure as a result of supercharging by the turbo-supercharger 36 is referred to as a "supercharging region". Note that, the reference pressure is a pressure value corresponding to the intake manifold pressure Pim that is obtained if the throttle is fully open in an example where a naturally aspirated internal combustion engine is adopted as the internal combustion engine 10.

In the present embodiment, a target engine output is determined based on the accelerator position. Further, a target torque and a target engine speed are determined based on a determined target engine output. An operating point defined by the target torque and the target engine speed is a target operating point of the internal combustion engine 10. The operation mode of the internal combustion engine 10 is determined depending on which operation region the target operating point is located in, and also depending on the path along which the target operating point has moved.

(Engine Torque Control)

The system of the present embodiment is premised on the following engine torque control. More specifically, upon the target torque being determined based on the accelerator position by the above described procedures, a requested air amount (requested value of an air (fresh air) amount Gair that is charged into a cylinder) Gair_req that is necessary to realize the target torque under the target air-fuel ratio in the current operation mode is calculated. Calculation of the air amount (actual air amount) Gair can be performed using a known air model. The spark timing is basically controlled to an MBT spark timing in accordance with the air-fuel ratio.

Figure 5:
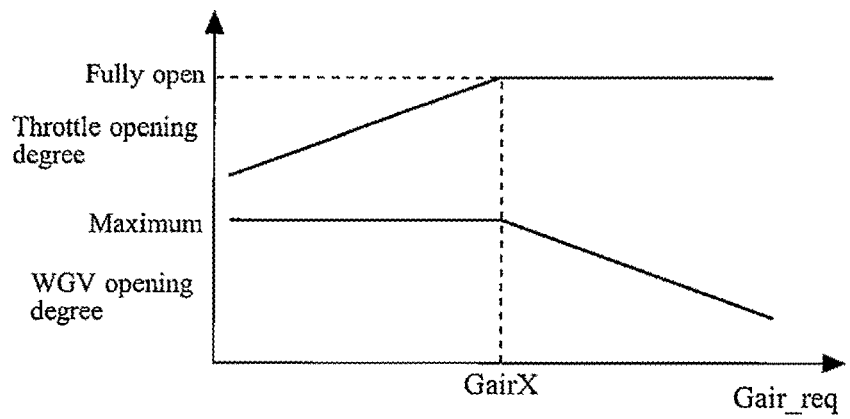
FIG. 5 is a view that represents a relation of a throttle opening degree and WGV opening degree with respect to a requested air amount Gair_req.

For the internal combustion engine 10, the air amount Gair can be adjusted using the throttle valve 38 and the WGV 48. FIG. 5 is a view that represents a relation of the throttle opening degree and WGV opening degree with respect to the requested air amount Gair_req. As shown in FIG. 5, in a region in which the requested air amount Gair_req is small, the air amount Gair is controlled so that, in a state in which the WGV 48 is opened to the maximum opening degree within the opening degree control range, the requested air amount Gair_req is obtained by adjusting the opening degree of the throttle valve 38. Specifically, control is performed so that the larger the requested air amount Gair_req is, the larger the value that the throttle opening degree is adjusted to.

Where an air amount Gair_req is requested that is larger than an air amount GairX that is obtained if the throttle opening degree is made a fully-open opening degree when the WGV opening degree equals the maximum opening degree, the intake manifold pressure Pim is controlled by adjusting the WGV opening degree in a state in which the throttle opening degree is opened fully. Specifically, control is performed so that the larger that the requested air amount Gair_req is, the smaller the WGV opening degree becomes. As a result, the air amount Gair is controlled so that the requested air amount Gair_req is obtained. Note that, if the target air-fuel ratio changes between the stoichiometric air-fuel ratio and the lean air-fuel ratio, the amount of exhaust energy that the turbine 36b recovers under the same WGV opening degree changes. Because of this, the relation between the WGV opening degree and the intake manifold pressure Pim changes. Therefore, the relation illustrated in FIG. 5 is prepared for each operation mode.

(Issue if Switching Operation Modes from Supercharged Lean Burn Operation to Stoichiometric Burn Operation)

Figure 6:
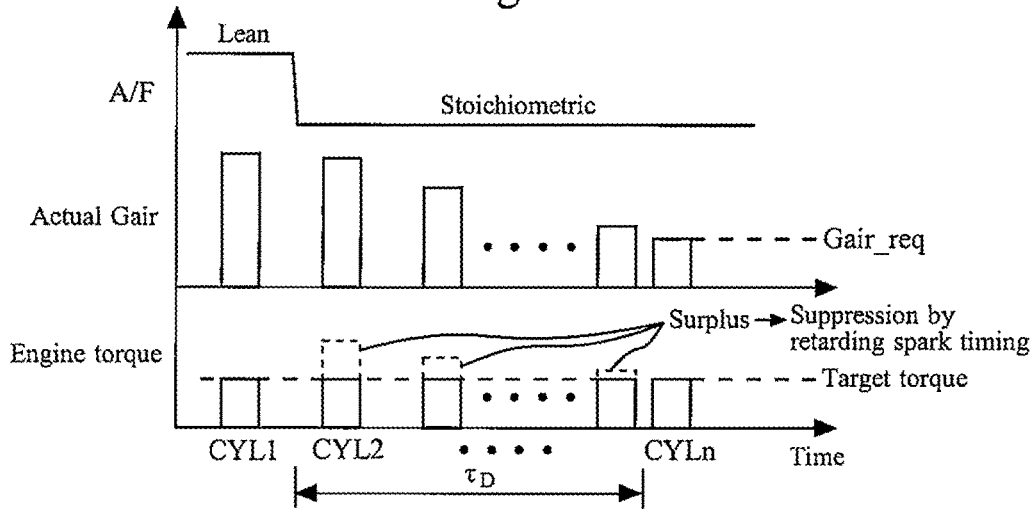
FIG. 6 is a time chart for describing an issue that arises at a time of switching of operation modes from lean burn operation performed in the supercharging region to stoichiometric burn operation.

FIG. 6 is a time chart for describing an issue that arises at a time of switching of the operation modes from lean burn operation performed in the supercharging region (hereunder, referred to simply as "supercharged lean burn operation") to stoichiometric burn operation. A region on a high load side (supercharging region) in the lean burn region shown in FIG. 4 corresponds to an operation region in which supercharged lean burn operation is performed. Note that, the torque control technique illustrated in FIG. 6 is a known technique that is referred to for comparison with the technique of the present embodiment. Further, as one example, FIG. 6 illustrates operations in an example where the target torque does not change between before and after switching of the operation modes.

The air amount Gair required to generate, under the stoichiometric air-fuel ratio, the same torque as a torque generated during lean burn operation is less than the air amount required during the lean burn operation. Therefore, in the example of switching from supercharged lean burn operation to stoichiometric burn operation, with some exceptions, it is necessary to reduce the air amount Gair accompanying the switching of the operation modes in order to suppress the occurrence of a torque level difference. Note that, an example of the "some exceptions" used here is where a high torque in a supercharging region that utilizes stoichiometric burn operation is requested in a state in which a low torque is being generated in a naturally aspirated region that utilizes lean burn operation.

In order to rapidly perform the switching from lean burn operation to stoichiometric burn operation where there is a necessity to reduce the air amount Gair, it is necessary to rapidly reduce the air amount (actual air amount) Gair as far as the requested air amount Gair_req under the stoichiometric burn operation after the switching. If the switching is from lean burn operation that utilizes the naturally aspirated region, the air amount Gair can be decreased with high responsiveness by adjusting the opening degree of the throttle valve 38. In contrast, in the supercharging region, the intake manifold pressure Pim is raised by closing the WGV 48 to raise the supercharging pressure, and a requested air amount Gair_req is thereby secured that is greater than an amount required if utilizing the naturally aspirated region. Consequently, the air amount Gair that should be decreased is larger in the example of the switching from supercharged lean burn operation to stoichiometric burn operation. In addition, at a time of the switching from supercharged lean burn operation to stoichiometric burn operation, an operation for reducing the air amount Gair includes opening of the WGV 48 as well as adjusting the opening degree of the throttle valve 38. Time is required until the supercharging pressure and the intake manifold pressure Pim drop accompanying the opening of the WGV 48 and the actual air amount Gair then decreases. Thus, at a time of the switching from supercharged lean burn operation to stoichiometric burn operation, a response delay period (corresponds to "intake-port-pressure decreasing period" in the present disclosure) $\tau_D$ that is required until the actual intake manifold pressure Pim falls to the requested intake manifold pressure (requested intake port pressure) Pim_req for stoichiometric burn operation increases. Also, the actual air amount Gair becomes excessive relative to the requested air amount Gair_req during the response delay period $\tau_D$. Note that, the response delay period $\tau_D$ lengthens as the difference between the air-fuel ratio before and after the switching increases, because the air amount Gair that should be reduced increases.

If the air-fuel ratio is immediately switched to the stoichiometric air-fuel ratio upon receiving a request to switch the operation modes irrespective of the existence of the aforementioned response delay period $\tau_D$, as shown by a dashed line in FIG. 6 as an engine torque in a combustion cycle CYL2, an engine torque that is higher than the target torque is generated and a torque level difference arises. In order to avoid such a torque level difference, it is also conceivable to use a technique that sets the fuel injection amount during the response delay period $\tau_D$ so as to satisfy the target torque under the actual air amount Gair. However, if this technique is used, accompanying a decrease in the actual air amount Gair, the air-fuel ratio during the response delay period $\tau_D$ gradually changes toward the stoichiometric air-fuel ratio from the target air-fuel ratio in lean burn operation performed before the switching. In the internal combustion engine 10, during the process of this change, combustion is performed that uses an air-fuel ratio region in which there is a large amount of NOx emissions. This leads to an increase in the NOx emissions amount from each cylinder.

On the other hand, according to the known technique illustrated in FIG. 6, if a request to switch to stoichiometric burn operation is detected in a combustion cycle CYL1 in which lean burn operation is being performed, the air-fuel ratio is rapidly switched to the stoichiometric air-fuel ratio in the combustion cycle CYL2 that is the combustion cycle of the nearest cylinder for which a delay in switching of the fuel injection amount does not occur. Further, retardation of the spark timing is executed to ensure that excess torque (see the broken lines in FIG. 6) does not arise in the combustion cycle CYL2. Retardation of the spark timing is executed until reaching a combustion cycle CYLn in which an actual air amount Gair that is equivalent to the requested air amount Gair_req is obtained. According to this technique, although an increase in the NOx emissions amount can be avoided by immediately switching the air-fuel ratio, the fuel efficiency deteriorates because it is necessary to inject fuel of an amount that is in accordance with the actual air amount Gair during the response delay period $\tau_D$ so that the stoichiometric air-fuel ratio that is the target air-fuel ratio after the switching is obtained. Further, since it is necessary to rely significantly on retardation of the spark timing to suppress the occurrence of a torque level difference, a deterioration in the fuel efficiency as well as a deterioration in combustion and torque fluctuations that accompany the deterioration in combustion occur.

An essential issue relating to the switching from supercharged lean burn operation to stoichiometric burn operation is that by only opening the WGV 48, the actual air amount Gair is not caused to change rapidly to the requested air amount Gair_req for stoichiometric burn operation. According to the known technique illustrated in FIG. 6, because suppression of an increase in engine torque that is due to a response delay with respect to the intake air is performed using control of the spark timing that provides excellent controllability, this technique leads to a deterioration in, e.g., combustion. Therefore, it can be said that if the air amount Gair can be rapidly decreased if a switching request is issued, it will not be necessary to rely on retardation of the spark timing. More specifically, it can be said that retardation of the spark timing can be avoided, or at least the retardation amount can be reduced. Further, it can be said that the number of cycles in which retardation of the spark timing is executed can be decreased.

(Overview of Control in First Embodiment)

According to the exhaust variable valve train 30 of the internal combustion engine 10, as described above, the operating angle of the exhaust valve 28 can be changed with a high degree of freedom, and an arbitrary number of valve opening periods of the exhaust valve 28 can also be set during a single combustion cycle. Therefore, in the present embodiment a configuration is adopted in which, during the response delay period $\tau_D$ of the intake manifold pressure Pim that arises accompanying the switching from supercharged lean burn operation to stoichiometric burn operation, two-time opening control of the exhaust valve 28 is executed using the exhaust variable valve train 30 in order to rapidly decrease the air amount Gair. Hereunder, control of valve opening characteristics of the exhaust valve 28 will be described in detail referring to FIG. 7.

Figure 7:
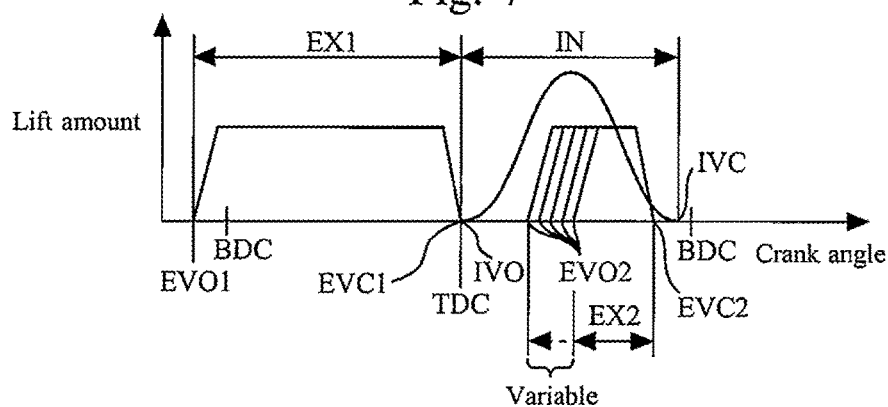
FIG. 7 is a view for describing an overview of two-time opening control of an exhaust valve used if switching operation modes from supercharged lean burn operation to stoichiometric burn operation in the first embodiment of the present disclosure.

FIG. 7 is a view for describing an overview of the two-time opening control of the exhaust valve 28 used if switching operation modes from supercharged lean burn operation to stoichiometric burn operation in the first embodiment of the present disclosure. In the two-time opening control of the exhaust valve 28 in the present embodiment, operation of the exhaust valve 28 in an exhaust stroke and an intake stroke that are consecutive is as follows. That is, as shown in FIG. 7, a first opening/closing operation of the exhaust valve 28 is a normal opening/closing operation for discharging exhaust gas inside the cylinder to the exhaust passage 18, in which the exhaust valve 28 is opened at an opening timing EVO1 during the expansion stroke, and is thereafter closed at a closing timing EVC1 that is set at the exhaust top dead center (TDC). A valve opening period (operating angle) of this opening/closing operation is referred to as EX1.

In the example illustrated in FIG. 7, the intake valve 26 is opened at an opening timing IVO that is set at the exhaust top dead center similarly to the EVC1, and is thereafter closed during the intake stroke. However, a closing timing IVC of the intake valve 26 during the two-time opening control of the exhaust valve 28 need not necessarily be during the intake stroke, and may be during the compression stroke.

A second opening/closing operation of the exhaust valve 28 is executed during a valve opening period IN of the intake valve 26 in the intake stroke that follows the exhaust stroke. In this way, the exhaust valve 28 is driven to open and close twice during a single combustion cycle. Here, the opening timing and closing timing of the exhaust valve 28 that are provided during the valve opening period IN of the intake valve 26 are referred to as "EVO2" and "EVC2", respectively, and this valve opening period (operating angle) is referred to as "EX2". Note that, the exhaust stroke is a crank angle period from the expansion bottom dead center until the exhaust top dead center, and the intake stroke is a crank angle period from the exhaust top dead center until the intake bottom dead center. That is, the exhaust top dead center is the end point of the exhaust stroke and is also the start point of the intake stroke. Note that, in the present embodiment, both of the two exhaust valves 28 arranged for the same cylinder are opened and closed in the valve opening period EX1 and the valve opening period EX2.

According to the valve timings of the intake valve 26 and the exhaust valve 28 shown in FIG. 7, a valve overlap period OL1 is not provided between the first valve opening period EX1 of the exhaust valve 28 and the valve opening period IN of the intake valve 26. It is therefore possible, during the switching from supercharged lean burn operation to stoichiometric burn operation, to prevent intake air (fresh air) from blowing toward the exhaust port 18a from the intake port 16a via the combustion chamber 14 in the vicinity of the exhaust top dead center. This can suppress a deviation in the in-cylinder air amount Gair that is due to blow-through, and furthermore a deterioration in exhaust emissions. Note that, in a configuration where, unlike the configuration of the internal combustion engine 10 of the present embodiment, a fuel injection valve that injects fuel into the intake port 16a is provided, the gas that is an object of blow-through is an air-fuel mixture of air and fuel. Even if such a blow-through occurs, by the above described control, a deviation in the air amount Gair that is caused by the blow-through, and also adverse effects that the blow-through imparts to the exhaust system can be suppressed.

Further, according to the valve timing shown in FIG. 7, a valve overlap period OL2 is provided between the second valve opening period EX2 of the exhaust valve 28 and the valve opening period IN of the intake valve 26. If this kind of valve overlap period OL2 is provided in an intake stroke that is a period in which the piston 12 changes position so as to enlarge the in-cylinder volume, not only does air (fresh air) flow into the cylinder from the intake port 16a, but exhaust gas also flows into the cylinder as EGR gas from the exhaust port 18a. More specifically, if the valve opening period EX2 is not provided, a gas that flows into the cylinder during an intake stroke is only air. In contrast, by providing the valve opening period EX2 in a form which has the valve overlap period OL2 between the valve opening period IN and the valve opening period EX2, an inflow of air into the cylinder can be suppressed by an amount corresponding to the inflow amount of EGR gas. Therefore, compared to an example where the valve opening period EX2 is not provided, an amount Gair of air charged into the cylinder can be decreased. Further, by increasing/decreasing an operating angle EX2 of the exhaust valve 28 an amount Gegr of EGR gas charged into a cylinder can be adjusted, and as a result, the air amount Gair can be adjusted. Further, in the example of the valve timing shown in FIG. 7, the operating angle EX2 of the exhaust valve 28 is increased/decreased by adjusting the opening timing EVO2 while the closing timing EVC2 is kept fixed.

Figure 8:
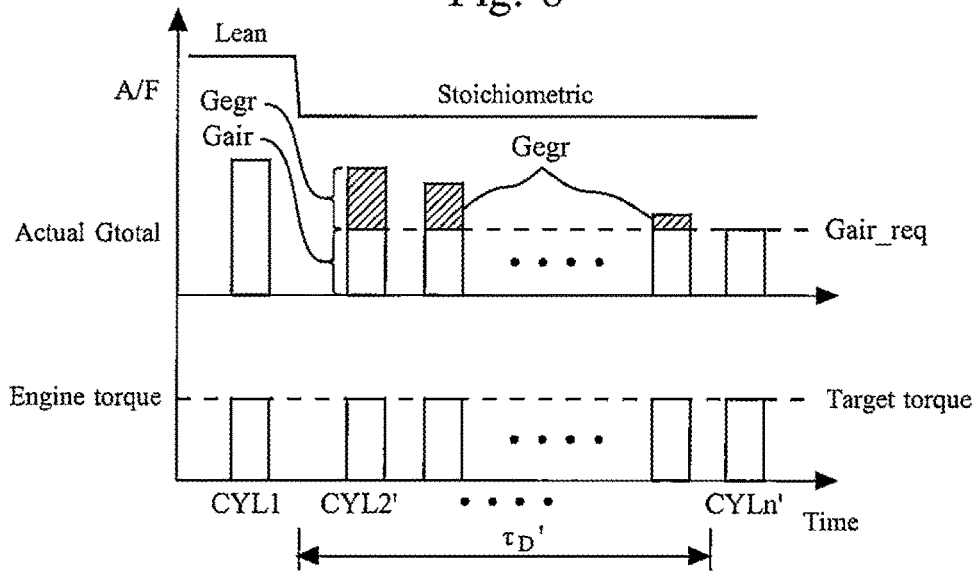
FIG. 8 is a time chart that represents operations at a time of the switching from supercharged lean burn operation to stoichiometric burn operation being executed with the two-time opening control of the exhaust valve.

FIG. 8 is a time chart that represents operations at a time of the switching from supercharged lean burn operation to stoichiometric burn operation being executed with the above described two-time opening control of the exhaust valve 28. Note that, as one example, FIG. 8 illustrates operations in an example where the target torque does not change between before and after the switching of the operation modes.

The control of the present embodiment is executed during the two-time opening control of the exhaust valve 28 in accordance with the following manner. That is, where a request to switch from supercharged lean burn operation to stoichiometric burn operation is detected in a combustion cycle CYL1, in a combustion cycle CYL2' that is the combustion cycle of the nearest cylinder for which a delay in both switching of the fuel injection amount and a start of two-time opening control of the exhaust valve 28 does not occur, the air-fuel ratio is rapidly switched to the stoichiometric air-fuel ratio and the two-time opening control of the exhaust valve 28 is started. The operating angle EX2 of the exhaust valve 28 in the combustion cycle CYL2' is adjusted to a value for ensuring that the actual air amount Gair comes close to the requested air amount Gair_req in the stoichiometric burn operation performed after the switching by limiting the introduction of air by introducing EGR gas. Note that, hereunder, the requested air amount Gair_req in the stoichiometric burn operation performed after the switching is referred to simply as "stoichiometric requested air amount Gair_req".

As shown in FIG. 8, the sum of the air amount Gair and the EGR gas amount Gegr that have been respectively charged into the cylinder is a total in-cylinder charged gas amount Gtotal. Performing the above described adjustment of the operating angle EX2 of the exhaust valve 28 for the combustion cycle CYL2' corresponds to, if the valve opening period EX2 is not provided, using an inflow of EGR gas to limit an inflow of air that should be charged into the cylinder. Consequently, with using the inflow of EGR gas, the actual air amount Gair can be decreased to an amount corresponding to the stoichiometric requested air amount Gair_req. In addition, fuel of an amount required in order for the air-fuel ratio in the combustion cycle CYL2' to realize the stoichiometric air-fuel ratio under the stoichiometric requested air amount Gair_req is injected. As a result, as shown in FIG. 8, even if the air-fuel ratio is immediately switched to the stoichiometric air-fuel ratio in the combustion cycle CYL2', the generation of excess engine torque that exceeds the target torque can be suppressed.

Further, during a response delay period $\tau_D'$ of the intake manifold pressure Pim accompanying opening of the WGV 48 (that is, a period in which the actual intake manifold pressure Pim decreases toward the requested intake manifold pressure Pim_req with the passage of time), the EGR gas amount Gegr required for limiting the inflow of air into the cylinder decreases with the passage of time (that is, with the passage of combustion cycle). The response delay period $\tau_D'$ corresponds to the "intake-port-pressure decreasing period" in the present disclosure. Therefore, in the control of the present embodiment, during the response delay period $\tau_D'$ the operating angle EX2 of the exhaust valve 28 is reduced so that the EGR gas amount Gegr decreases as the combustion cycle progresses, while ensuring that the actual air amount Gair can be maintained at an amount corresponding to the stoichiometric requested air amount Gair_req. Subsequently, in a combustion cycle CYLn' in which the actual intake manifold pressure Pim reaches the requested intake manifold pressure Pim_req, the two-time opening control of the exhaust valve 28 is ended.

(Specific Processing in First Embodiment)

Figure 9:
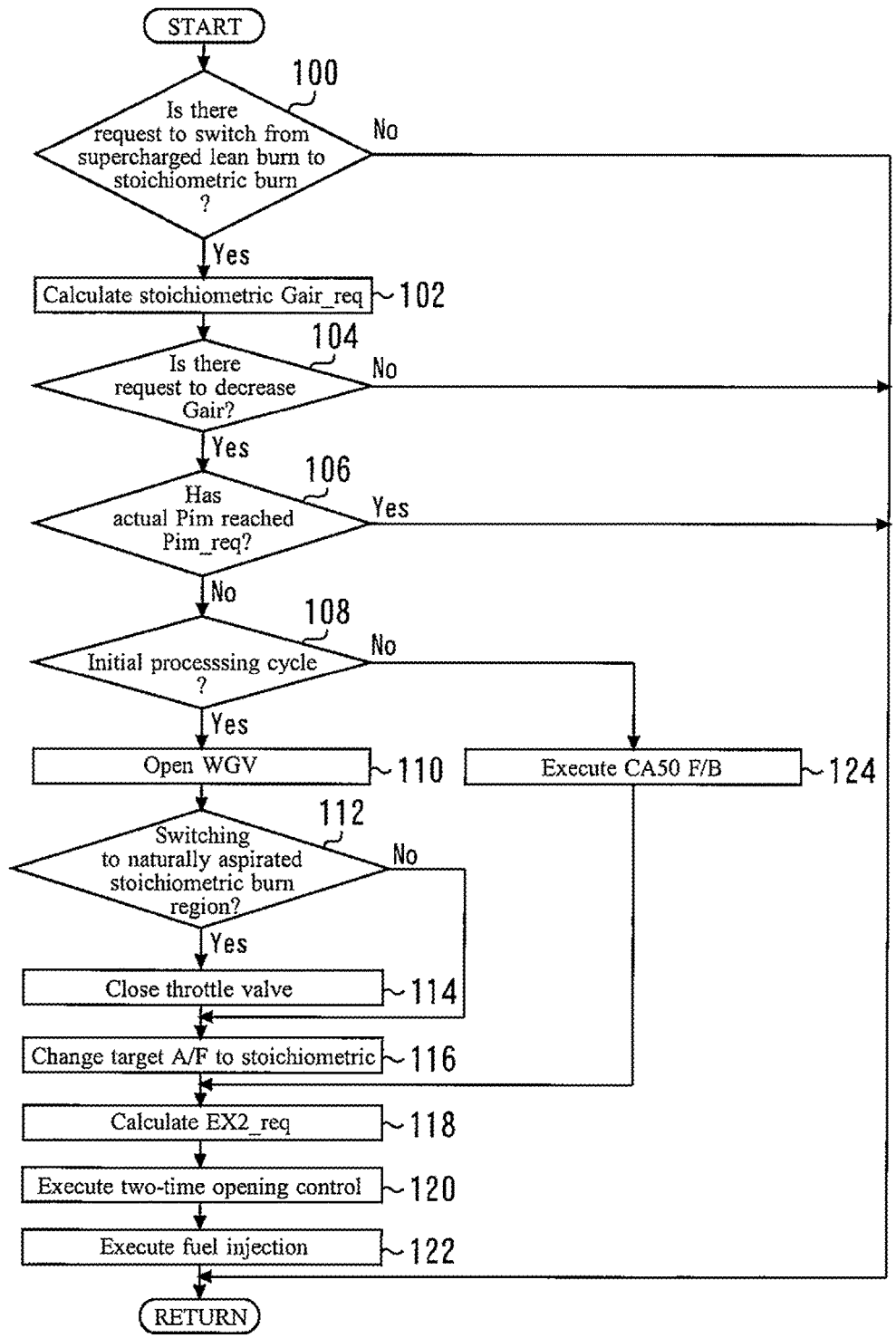
FIG. 9 is a flowchart illustrating a routine executed by an ECU to realize switching control of the operation mode according to the first embodiment of the present disclosure.

FIG. 9 is a flowchart illustrating a routine executed by the ECU 60 to realize switching control of the operation mode according to the first embodiment of the present disclosure. The present routine is executed each time a predetermined start-up timing arrives. The following processing includes control that utilizes a combustion analysis result (CA50 described later) obtained utilizing an in-cylinder pressure detected by the in-cylinder pressure sensor 24. Therefore, here, as one example, the aforementioned start-up timing is taken as being the opening timing EVO1 of the exhaust valve 28 that is a timing after combustion ends.

According to the routine shown in FIG. 9, first, the ECU 60 proceeds to step 100 to determine whether or not there is a switching request to switch the operation mode from supercharged lean burn operation to stoichiometric burn operation. Specifically, as described above, a target operating point of internal combustion engine 10 is defined based on the target torque and target engine speed determined based on the accelerator position. In present step 100, the most recent accelerator position is detected using the accelerator position sensor 56. If it is recognized that the target operating point based on the accelerator position has moved from a supercharged lean burn region to a stoichiometric burn region, the ECU 60 determines that the aforementioned switching request exists. Further, ECU 60 also determines that the aforementioned switching request exists during a period after the target operating point has moved from the supercharged lean burn region to the stoichiometric burn region until the actual operating point arrives at the target operating point. If the result of the determination in step 100 is negative, the ECU 60 swiftly ends the current processing cycle.

If the result of the determination in step 100 is affirmative, the ECU 60 proceeds to step 102. In step 102, stoichiometric requested air amount Gair_req is calculated as a value that is required for realizing, under the stoichiometric air-fuel ratio, the target torque in the stoichiometric burn operation performed after the switching.

Next, the ECU 60 proceeds to step 104 to determine whether or not the switching request detected by the processing in step 100 is a switching request of a form such that the stoichiometric requested air amount Gair_req for after the switching becomes less than the requested air amount Gair_req for before the switching. If the result of the present determination is negative, the ECU 60 swiftly ends the current processing cycle. In contrast, if the result of the determination in step 104 is positive following a positive determination in step 100, the ECU 60 determines that there is a switching request that is an object of control by the present routine, and proceeds to step 106.

In step 106, the ECU 60 determines whether or not the actual intake manifold pressure Pim detected by the second intake air pressure sensor 44 has reached the requested intake manifold pressure Pim_req for the stoichiometric burn operation performed after the switching. The requested intake manifold pressure Pim_req is calculated as a value that is required to realize the stoichiometric requested air amount Gair_req under a requested throttle opening degree that corresponds to the stoichiometric requested air amount Gair_req. Note that, the requested throttle opening degree itself can be calculated, for example, by referring to the relation illustrated in FIG. 5.

If it is determined in step 106 that Pim has not yet reached Pim_req, the ECU 60 proceeds to step 108 to determine whether or not the current processing cycle of the present routine is an initial processing cycle executed after the result determined in step 104 is affirmative (that is, after detection of a switching request that is a control object).

If it is determined in step 108 that the current processing cycle is the initial processing cycle, the ECU 60 proceeds to step 110. In step 110, the ECU 60 issues an instruction to open the WGV 48 for decreasing the intake manifold pressure Pim. If the stoichiometric burn region that is requested corresponds to the naturally aspirated region, the maximum opening degree is selected as the requested WGV opening degree. If the stoichiometric burn region that is requested corresponds to a supercharging region, an opening degree with which the stoichiometric requested air amount Gair_req can be realized in a state in which the throttle valve 38 is set to a full opening degree is selected as the requested WGV opening degree. If the instruction to open the WGV 48 is issued in present step 110, the WGV 48 is immediately driven so that the requested WGV opening degree is obtained.

Next, the ECU 60 proceeds to step 112. In step 112, the ECU 60 determines whether or not the stoichiometric burn region that is requested corresponds to the naturally aspirated region. If the result of the present determination is affirmative, the ECU 60 proceeds to step 114, while if the result of the present determination is negative, the ECU 60 proceeds to step 116.

In step 114, the ECU 60 issues an instruction to close the throttle valve 38 so as to obtain the requested throttle opening degree that corresponds to the stoichiometric requested air amount Gair_req. If the instruction to close the throttle valve 38 is issued, the throttle valve 38 is immediately driven so that the requested throttle opening degree is obtained. In step 116, the target air-fuel ratio is changed to the stoichiometric air-fuel ratio.

Next, the ECU 60 proceeds to step 118 to calculate a requested operating angle EX2_req of the exhaust valve 28 that is used in the two-time opening control of the exhaust valve 28. As described above, in addition to normal opening/closing in the valve opening period EX1, by providing, in the intake stroke, the valve opening period (operating angle) EX2 in a manner that overlaps with the valve opening period IN, an effect can be obtained whereby an inflow of air from the intake port 16a is inhibited by an inflow of EGR gas into the cylinder from the exhaust port 18a. The operating angle EX2 that is necessary in order to decrease the air amount Gair to the stoichiometric requested air amount Gair_req utilizing this effect is referred to as a "requested operating angle EX2_req". A relation of the requested operating angle EX2_req with respect to the intake manifold pressure Pim, an exhaust manifold pressure (=exhaust port pressure) Pem that is the exhaust pressure on an upstream side of the turbine 36b, and the engine speed and the stoichiometric requested air amount Gair_req is previously defined by, for example, experimentation, and a map that defines the relation is stored in the ECU 60.

Note that, as in the example illustrated in FIG. 7, the requested operating angle EX2_req that is previously set as described above is not limited to an operating angle that is set in a manner in which the operating angle EX2 is changed by adjusting the opening timing EVO2 while keeping the closing timing EVC2 fixed. That is, the requested operating angle EX2_req only has to satisfy a requirement that the requested operating angle EX2_req is defined as the operating angle EX2 that is required in order to decrease the air amount Gair to the stoichiometric requested air amount Gair_req utilizing the above described effect of the EGR gas. In addition, it is not necessarily necessary for all of the valve opening period EX2 to overlap with the valve opening period IN as in the above described example, and therefore, at least one part of the valve opening period EX2 only has to overlap with the valve opening period IN. Accordingly, for example, in contrast to the above described example, the requested operating angle EX2_req may be set using a method that adjusts the closing timing EVC2 while keeping the opening timing EVO2 fixed, or furthermore may be set using a method that freely adjusts both of the opening timing EVO2 and the closing timing EVC2 within a range that satisfies the aforementioned requirement.

In present step 118, the requested operating angle EX2_req that corresponds to the current intake manifold pressure Pim, exhaust manifold pressure Pem, engine speed and stoichiometric requested air amount Gair_req is calculated based on a map that defines the relation between the requested operating angle EX2_req and the intake manifold pressure Pim, exhaust manifold pressure Pem, engine speed and stoichiometric requested air amount Gair_req as described above. The intake manifold pressure Pim and engine speed that are used here can be acquired using the second intake air pressure sensor 44 and the crank angle sensor 58, respectively. A value calculated in step 102 can be used as the stoichiometric requested air amount Gair_req. The exhaust manifold pressure Pem can be estimated, for example, by a known technique based on a supercharging pressure detected by the first intake air pressure sensor 42, an intake air flow rate detected by the air flow sensor 34, and a pressure downstream of the turbine. Alternatively, a sensor can be separately provided and used to detect the exhaust manifold pressure Pem. Note that a pressure downstream of the turbine can, for example, be estimated by a known technique based on an intake air flow rate detected by the air flow sensor 34.

Next, the ECU 60 proceeds to step 120 to issue instructions relating to two-time opening control of the exhaust valve 28. More specifically, in step 120 the ECU 60 issues an instruction requesting opening/closing of the exhaust valve 28 in the intake stroke based on the requested operating angle EX2_req calculated as described above, and an instruction to control the closing timing EVC1 of the exhaust valve 28 to the exhaust top dead center. These instructions are swiftly reflected with respect to a cylinder A in which the opening timing EVO1 is reached when the current processing cycle is started. As a result, the exhaust variable valve train 30 drives the exhaust valve 28 of the cylinder A so that the closing timing EVC1 equals the exhaust top dead center, and also drives the exhaust valve 28 of the cylinder A to open and close in accordance with the requested operating angle EX2_req in a combustion cycle A that has an intake stroke following the closing timing EVC1. By this means, the two-time opening control of the exhaust valve 28 is executed. With regard to the valve overlap period OL1 between the valve opening period EX1 and the valve opening period IN, according to the aforementioned two-time opening control, if a valve overlap period OL1 is set at a time of supercharged lean burn operation performed before the switching, the valve overlap period OL1 becomes zero. Further, if the valve overlap period OL1 is not provided before the switching (that is, if the closing timing EVC1 is already set at the exhaust top dead center), a state in which the valve overlap period OL1 is made zero is maintained.

Subsequently, the ECU 60 proceeds to step 122 to instruct a fuel injection for the combustion cycle A with a fuel amount necessary to realize the stoichiometric air-fuel ratio that is the current target air-fuel ratio under the stoichiometric requested air amount Gair_req. As a result, the fuel injection valve 20 executes fuel injection of an amount in accordance with the aforementioned instruction at a predetermined injection timing.

In contrast, if the ECU 60 determines in step 108 that the current processing cycle is not the initial processing cycle performed after detection of a switching request, the ECU 60 executes the processing in step 124, and thereafter proceeds to step 118. In step 124, CA50 feedback control is executed. In-cylinder pressure data that is in association with the crank angle can be acquired by utilizing the in-cylinder pressure sensor 24 and the crank angle sensor 58. Data for a heat release amount Q in a cylinder at each predetermined crank angle can be calculated using the aforementioned in-cylinder pressure data and the first law of thermodynamics. Further, a mass fraction burned MFB at an arbitrary crank angle $\theta$ can be calculated in accordance with the following Expression (1) using the calculated data for the heat release amount Q. By this method, as shown in FIG. 10 described later, a waveform of data for the MFB with respect to the crank angle $\theta$ can be acquired.

$$MFB = \frac{Q(\theta) - Q(\theta_{min})}{Q(\theta_{max}) - Q(\theta_{min})} \times 100 \quad (1)$$

Where, in the above Expression (1), $\theta_{min}$ represents a combustion start point, and $\theta_{max}$ represents a combustion end point.

Figure 10:
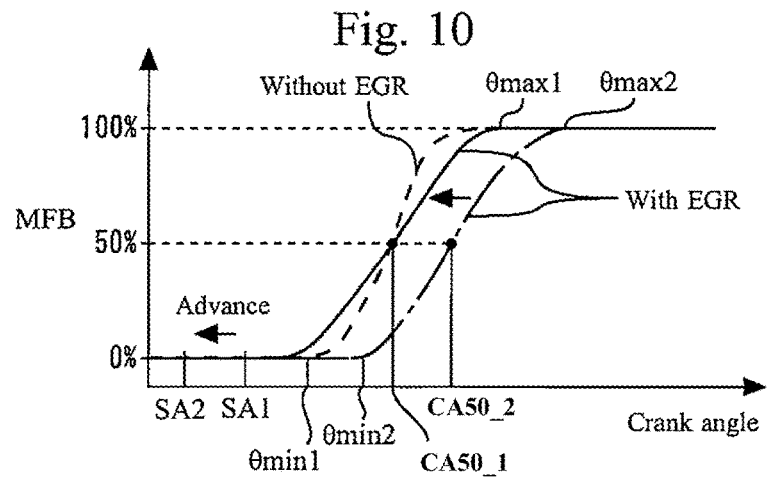
FIG. 10 is a view for describing an overview of CA50 feedback control.

FIG. 10 is a view for describing an overview of the CA50 feedback control. The term "CA50" refers to a crank angle at which MFB reaches 50%, that is, a combustion center, and can be acquired using data of MFB acquired as described above. A broken line shown in FIG. 10 represents a waveform of MFB data in an example where there is no introduction of EGR gas into a cylinder. On the other hand, a dot-and-dash line represents a waveform of MFB data in an example where combustion is performed using a spark timing SA1 that is the same as in the example of the combustion of the broken line waveform, while performing introduction of EGR gas into a cylinder. Note that, stoichiometric burn operation that is an operation mode performed after the switching is adopted as the object of the combustion shown in FIG. 10.

If introduction of EGR gas is performed, the combustion becomes slower as will be understood by comparing the broken line and the dot-and-dash line in FIG. 10. Because of this, an ignition delay period (SA1-$\theta$min2) and a combustion period ($\theta$min2-$\theta$max2) of the example where introduction of EGR gas is performed become longer in comparison to an ignition delay period (SA1-$\theta$min1) and a combustion period ($\theta$min1-$\theta$max1) in an example where there is no introduction of EGR gas, respectively. As a result, a value CA50_2 in an example in which EGR gas is introduced is retarded compared to a value CA50_1 in an example in which EGR gas is not introduced.

In stoichiometric burn operation, the spark timing SA1 is set so that CA50_1 is obtained as a combustion center at which the internal combustion engine 10 can most efficiently perform combustion under a condition in which there is no introduction of EGR gas. That is, the spark timing SA1 corresponds to the MBT spark timing under stoichiometric combustion. Accordingly, if the spark timing remains at SA1 in an example where EGR gas is introduced, a deviation arises with respect to CA50 as described above. The CA50 feedback control is control for adjusting the spark timing SA to eliminate such a deviation with respect to CA50.

Specifically, a target CA50 at a time of stoichiometric burn operation is set to a value in accordance with the air amount Gair and engine speed, as a combustion center at which the internal combustion engine 10 can perform combustion most efficiently under a condition that there is no introduction of EGR gas. In the present feedback control, the spark timing SA is controlled so as to eliminate a difference between CA50 (actual CA50) that is calculated based on MFB data acquired utilizing the in-cylinder pressure sensor 24 and the target CA50. Where the aforementioned feedback control is applied to the example illustrated in FIG. 10, the spark timing is advanced from SA1 to SA2 in order to eliminate a difference between CA50_2 that corresponds to an actual CA50 and CA50_1 that corresponds to a target CA50. Thus, the spark timing SA is brought near to the MBT spark timing under a condition that the operation is accompanied by introduction of EGR gas. Therefore, as shown by a solid line in FIG. 10, the combustion including the combustion center CA50 can be brought near to the combustion in an example where there is no introduction of EGR gas. Consequently, a deterioration in combustion accompanying two-time opening control of the exhaust valve 28 and torque fluctuations can be suppressed. Further, by suppressing a deterioration in combustion, suppression of a torque level difference between before and after the switching of the operation modes can be performed more accurately.

In the present routine, where the actual intake manifold pressure Pim has reached the requested intake manifold pressure Pim_req in the course of the processing of steps 124 and 118 to 122 being repeatedly executed for each combustion cycle of the respective cylinders after detecting a request for a switching that is a control object, the ECU 60 ends the processing that should be performed with respect to the current switching request, including the processing of two-time opening control of the exhaust valve 28.

Figure 11:
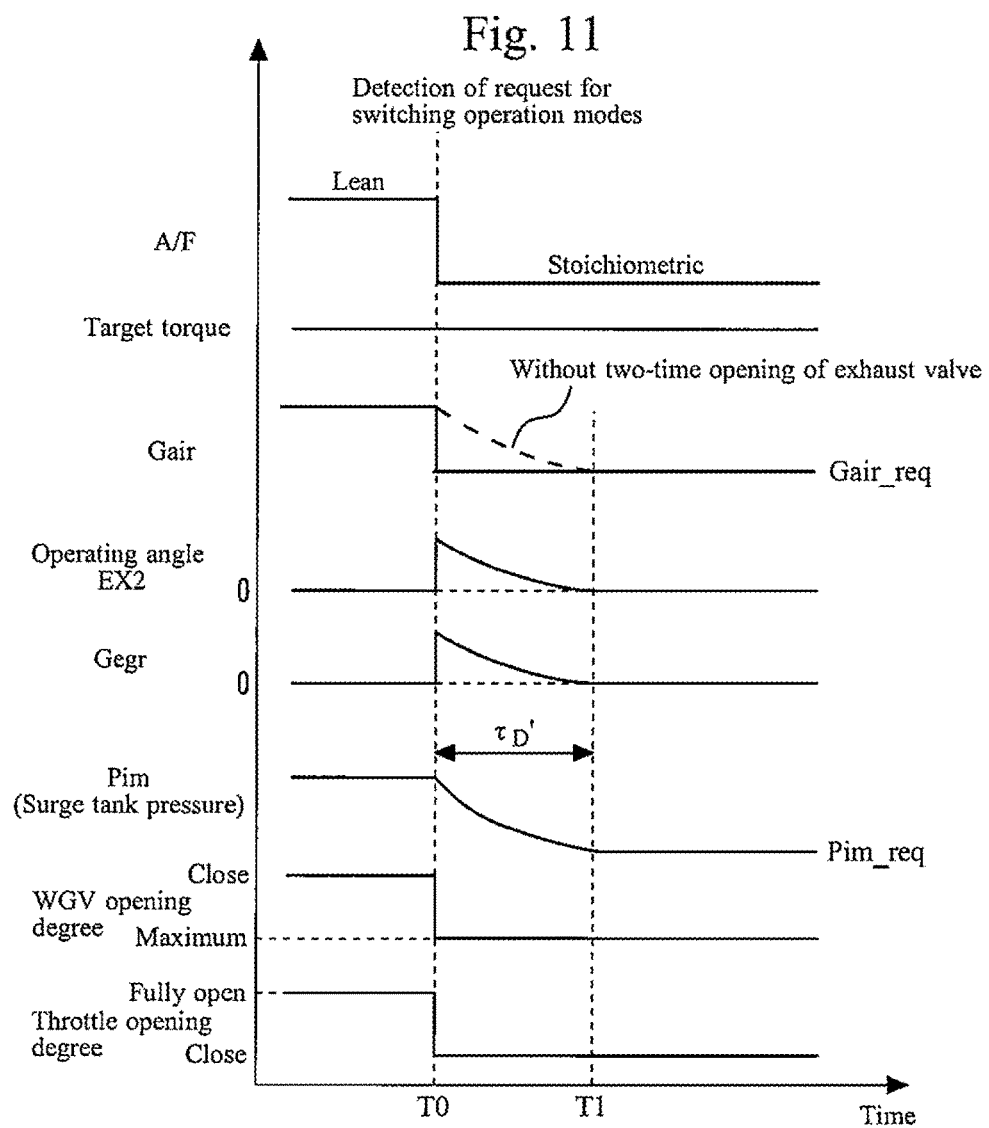
FIG. 11 is a time chart illustrating an example of operations where the switching of the operation modes from supercharged lean burn operation to stoichiometric burn operation is performed with execution of the processing in the routine shown in FIG. 9.

FIG. 11 is a time chart illustrating an example of operations in an example where the switching of the operation modes from supercharged lean burn operation to stoichiometric burn operation is performed with execution of the processing in the routine shown in FIG. 9. This time chart illustrates changes in the air-fuel ratio (A/F), the target torque, the in-cylinder air amount (fresh air amount) Gair, the operating angle (valve opening period) EX2 of the exhaust valve 28 during an intake stroke, amount of exhaust gas (EGR gas) Gegr that is charged into a cylinder under the operating angle EX2, the intake manifold pressure (surge tank pressure) Pim, the WGV opening degree and the throttle opening degree. FIG. 11 illustrates operations at a time of the switching is performed from the supercharged lean burn region to the naturally aspirated region inside the stoichiometric burn region in an example in which the target torque is constant with respect to before and after the switching of the operation modes.

If a request to switch the operation mode is detected at a time T0 shown in FIG. 11, the target air-fuel ratio is changed from a lean air-fuel ratio for supercharged lean burn operation to the stoichiometric air-fuel ratio. Further, the WGV opening degree is controlled to the maximum opening degree in order to lower the intake manifold pressure Pim by lowering the supercharging pressure. In addition, the throttle opening degree is controlled so as to equal an opening degree that realizes the stoichiometric requested air amount Gair_req. As a result, the actual intake manifold pressure Pim decreases as shown in FIG. 11.

A time T1 shown in FIG. 11 corresponds to a timing at which the actual intake manifold pressure Pim reaches the requested intake manifold pressure Pim_req in stoichiometric burn operation. Accordingly, a time period (T0-T1) that is determined as a difference between the time T1 and the time T0 corresponds to the above described response delay period (intake-port-pressure decreasing period) $\tau_D'$. In an example where the two-time opening control of the exhaust valve 28 of the present embodiment is not executed because of a response delay of the intake manifold pressure Pim, a response delay of the air amount Gair that is charged into a cylinder also arises during the response delay period $\tau_D'$ as shown by a broken line in FIG. 11.

In contrast, according to the two-time opening control of the exhaust valve 28 of the present embodiment, in a period from a cycle in which the intake stroke is reached after the time T0 of a switching request being detected until a cycle that is immediately before the expiration of the response delay period $\tau_D'$, the exhaust valve 28 is opened and closed at the intake stroke using the operating angle (valve opening period) EX2 that causes the in-cylinder air amount Gair to equals the stoichiometric requested air amount Gair_req. Further, the operating angle EX2 is decreased accompanying a decrease in the actual intake manifold pressure Pim during the response delay period $\tau_D'$, provided that the air amount Gair is the requested air amount Gair_req. In accompaniment therewith, the EGR gas amount Gegr charged into a cylinder also decreases accompanying a decrease in the actual Pim in a manner that takes, as a peak, a value of the EGR gas amount Gegr in the initial combustion cycle.

Thereafter, if the actual Pim has reached the requested Pim_req at the time T1, use of the operating angle EX2 is stopped, and the EGR gas amount Gegr introduced by a second opening of the exhaust valve 28 becomes zero. Further, during the response delay period $\tau_D'$, the fuel injection amount is controlled so as to equal an amount that is necessary to realize the stoichiometric air-fuel ratio under the stoichiometric requested air amount Gair_req, and the actual air-fuel ratio is thereby controlled immediately to the stoichiometric air-fuel ratio upon receiving a switching request.

As described above, according to the control of the present embodiment, the valve overlap period OL1 between the valve opening period EX1 and the valve opening period IN is not provided, and the valve opening period EX2 is set in a manner such that the valve opening period EX2 overlaps with the valve opening period IN during the intake stroke. Therefore, blow-through of air (fresh air) to the exhaust port 18a through the combustion chamber 14 from the intake port 16a can be suppressed in the vicinity of the exhaust top dead center, and furthermore the air amount Gair charged into a cylinder can be rapidly (more specifically, on a combustion cycle basis) decreased to the stoichiometric requested air amount Gair_req by utilizing an inflow of EGR gas during the intake stroke. Thus, even if the air-fuel ratio is switched to the stoichiometric air-fuel ratio immediately upon detection of a request to switch from supercharged lean burn operation to stoichiometric burn operation, the occurrence of a difference in level of the engine torque can be suppressed without relying on retardation of the spark timing. Further, since switching is performed in a steplike manner to the stoichiometric air-fuel ratio from the lean air-fuel ratio that is adopted as a target during supercharged lean burn operation, it is possible to avoid using, accompanying the switching, an air-fuel ratio region in which a NOx emissions amount is large. Consequently, according to the control of the present embodiment, the operation mode can be switched while suppressing an increase in the NOx emissions amount.

Note that, in the above described first embodiment, the valve opening period EX1 and the valve opening period EX2 correspond to the "first valve opening period" and the "second valve opening period" according to the present disclosure, respectively. Further, the ECU 60 which is programmed to execute the processing in step 110, execute the processing in steps 118 and 120, and execute the processing in step 122 corresponds to the "controller" according to the present disclosure.

Second Embodiment

Next, a second embodiment of the present disclosure will be described with reference to FIG. 12 to FIG. 14.

[System Configuration of Second Embodiment]
(Overall System Configuration)

As described below, a system of the second embodiment is configured in the same manner as the system of the first embodiment described above with the exception that the exhaust variable valve train 30 of the first embodiment is replaced by an exhaust variable valve train 80.
(Configuration of Exhaust Variable Valve Train of Second Embodiment)

In the foregoing first embodiment, an example has been described in which the exhaust variable valve train 30 having the configuration shown in FIG. 2 is used to realize the above described two-time opening control of the exhaust valve 28. However, a specific configuration of an exhaust variable valve train that is an object of the present disclosure is not particularly limited as long as it is possible to set, as valve opening periods of one or a plurality of exhaust valves provided in the same cylinder, a first valve opening period that includes an exhaust stroke and adopts the exhaust top dead center as an end point and a second valve opening period in which one or all of the aforementioned one or a plurality of exhaust valves are opened and closed during an intake stroke that follows the exhaust stroke, and as long as it is possible to change valve opening characteristics of the aforementioned one or all of the exhaust valves in the second valve opening period. In the present second embodiment, as one example of a valve train used instead of the exhaust variable valve train 30, a valve train of the internal combustion engine 10 includes the exhaust variable valve train 80 having a configuration described hereunder.

Figure 12:
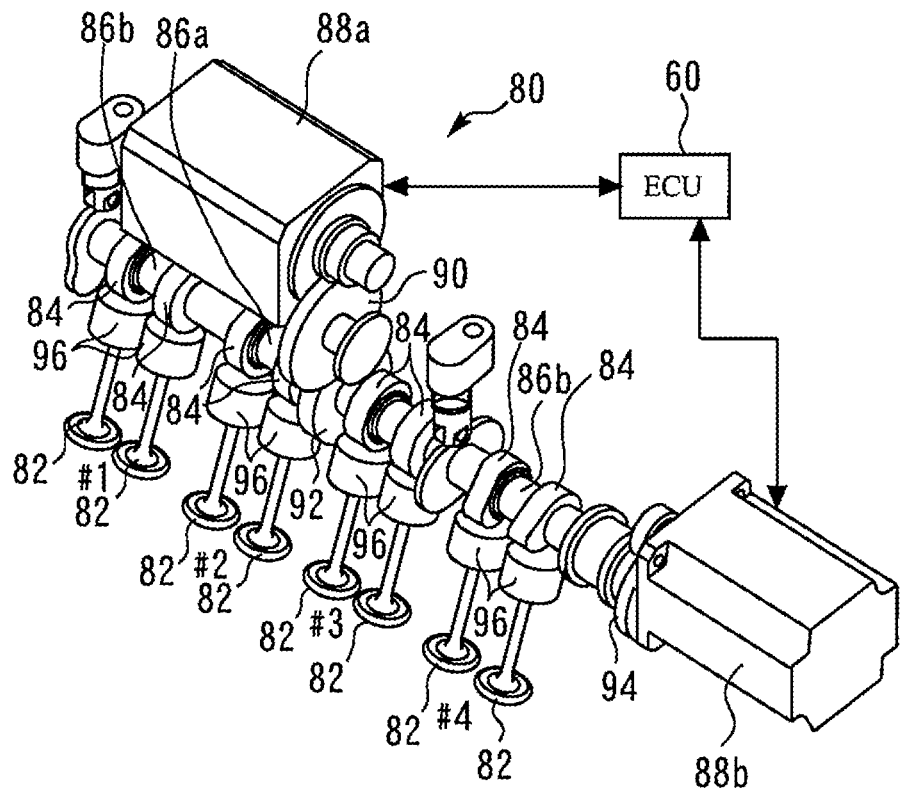
FIG. 12 is a view illustrating a schematic configuration of an exhaust variable valve train according to a second embodiment of the present disclosure.

FIG. 12 is a view illustrating a schematic configuration of the exhaust variable valve train 80 according to the second embodiment of the present disclosure. The exhaust variable valve train 80 is a known type where a camshaft 86 to which cams 84 that drive exhaust valves 82 are fixed is driven by an electric motor 88. In the internal combustion engine 10 that includes four cylinders (#1 to #4), combustion is performed in the firing order of #1→#3→#4→#2. More specifically, the exhaust variable valve train 80 is configured by an exhaust variable valve train 80a that drives the exhaust valves 82 of cylinder #2 and cylinder #3, and an exhaust variable valve train 80b that drives the exhaust valves 82 of cylinder #1 and cylinder #4.

The camshaft 86 is configured by a camshaft 86a to which cams 84 for cylinder #2 and cylinder #3 are fixed, and a camshaft 86b to which cams 84 for cylinder #1 and cylinder #4 are fixed. The camshaft 86a is arranged on top of cylinder #2 and cylinder #3. The camshaft 86b is arranged on top of cylinder #1 and cylinder #4 in a state in which the camshaft 86b is divided into two parts. The camshaft 86b that is divided into two parts is configured to integrally rotate by the two parts being connected through a connecting member (not illustrated in the drawings) that is inserted through the inside of the hollow camshaft 86a. According to this configuration, the camshaft 86a and the camshaft 86b can rotate independently of each other.

A driving force of an electric motor 88a that the exhaust variable valve train 80a includes is transmitted to the camshaft 86a through a gear 90 and a gear 92. A driving force of an electric motor 88b that the exhaust variable valve train 80b includes is transmitted to the camshaft 86b through a gear 94. Each of the electric motors 88a and 88b includes a rotational angle detection sensor for detecting a rotational position (rotational angle) of the electric motor 88a or 88b. The electric motors 88a and 88b are electrically connected to the ECU 60, and the rotational speed and rotational angle of the electric motors 88a and 88b are controlled by the ECU 60. By the ECU 60 controlling the rotational speed and rotational angle of the electric motors 88a and 88b, the rotational speed and rotational angle of the respective cams 84 can be controlled. Further, the exhaust valves 82 of each cylinder are pushed against the side of the cam 84 by a spring (not illustrated in the drawing). A pressing force from each of the cams 84 is transmitted to the exhaust valve 82 through a valve lifter 96.

Figure 13:
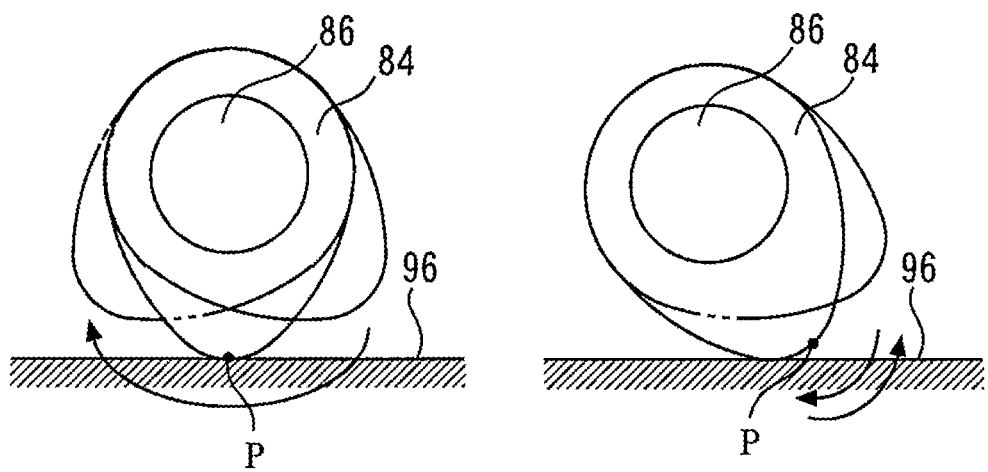
FIG. 13 is a view for describing two drive modes of the exhaust variable valve train shown in FIG. 12.

FIG. 13 is a view for describing two drive modes of the exhaust variable valve train 80 shown in FIG. 12. The exhaust variable valve train 80 includes a normal rotation drive mode and an oscillation drive mode as the drive modes for the cams 84. The normal rotation drive mode is a mode that, as shown in FIG. 13, continuously rotates the cam 84 in one direction by continuously rotating the electric motor 88 in one direction. The oscillation drive mode is a mode that, as shown in FIG. 13, causes the cam 84 to perform a reciprocating motion by switching the rotational direction of the electric motor 88 before the top point P of a nose of the cam 84 contacts the valve lifter 96 after the cam 84 begins to push the valve lifter 96.

According to the normal rotation drive mode, the exhaust valves 82 can be driven with a lift curve at which a maximum lift amount that is equivalent to the nose height of the cam 84 (more specifically, a maximum value of a maximum lift amount that is a peak value of a lift amount that is obtained during a single lift of the exhaust valve 82) is obtained. Further, by changing the rotational speed of the cam 84 by changing the rotational speed of the electric motor 88, the operating angle can be changed while keeping the maximum lift amount constant at the maximum value thereof.

According to the oscillation drive mode, the operating angle and maximum lift amount of the exhaust valve 82 can be changed by controlling an angular range within which the cam 84 oscillates by controlling the rotational angle of the electric motor 88 together with the control of the rotational speed of the cam 84. In addition, if using the oscillation drive mode, the operating angle can be adjusted while keeping the maximum lift amount constant by temporarily retaining the rotational angle of the cam 84 at an angle at which the maximum lift amount is reached and controlling the electric motor 88 so as to change the retention time period or by changing the rotational speed of the cam 84 while keeping constant an angular range in which the cam 84 oscillates. Further, the maximum lift amount can also be adjusted while keeping the operating angle constant by appropriately changing the rotational speed and the oscillation angle range of the cam 84. As described above, according to the oscillation drive mode, at least one of the operating angle and the maximum lift amount of the exhaust valves 82 can be changed.

Because the rotational speed and rotational angle of the electric motor 88 can be controlled with high flexibility based on instructions from the ECU 60, the ECU 60 can control the rotational speed and rotational angle of the cams 84 with high flexibility. Therefore, according to the exhaust variable valve train 80, each of the opening timing and closing timing of the exhaust valves 82 can be controlled to be an arbitrary timing by arbitrarily controlling energization of the electric motor 88. As a result, the operating angle (length of valve opening period) of the exhaust valve 82 can be continuously and freely controlled, and the maximum lift amount can be continuously and freely changed together with the operating angle, or instead of the operating angle. Further, by arbitrarily setting the energization timing of the electric motor 88, the number of valve opening periods of the exhaust valves 82 can be arbitrarily set during a single combustion cycle. In addition, at least one of changing one or both of the opening timing and closing timing, changing the operating angle in accompaniment therewith, and changing the maximum lift amount of the exhaust valves 82 with the aforementioned manner corresponds to changing of valve opening characteristics of the exhaust valves 82 by the exhaust variable valve train 80.

[Control of Second Embodiment]

(Overview of Control in Second Embodiment)

In the two-time opening control of the exhaust valves 82 of the present embodiment also, the end point of the first valve opening period EX1 is set at the exhaust top dead center, and the second valve opening period EX2 is set so as to overlap with the valve opening period IN of the intake valve 26 in the intake stroke. According to the exhaust variable valve train 80, the valve opening period EX1 can be set using the aforementioned normal rotation drive mode, and the valve opening period EX2 can be set using the oscillation drive mode or normal rotation drive mode.

Figure 14:
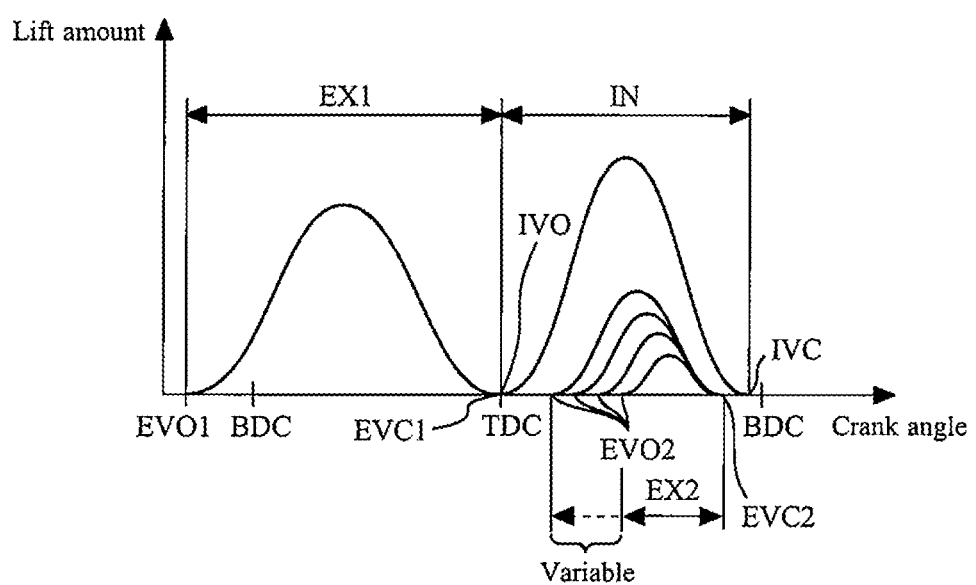
FIG. 14 is a view for describing an overview of two-time opening control of an exhaust valve that is used if switching operation modes from supercharged lean burn operation to stoichiometric burn operation in the second embodiment of the present disclosure.

FIG. 14 is a view for describing an overview of two-time opening control of the exhaust valves 82 that is used if switching operation modes from supercharged lean burn operation to stoichiometric burn operation in the second embodiment of the present disclosure. In the example illustrated in FIG. 14, the valve opening period EX2 is set using the oscillation drive mode. More specifically, in a form in which the opening timing EVO2 is changed while keeping the closing timing EVC2 constant, the operating angle EX2 is changed and the maximum lift amount is also changed in conjunction with the changing of the operating angle EX2. Note that, in the present embodiment, both of the two exhaust valves 82 that are arranged with respect to the same cylinder are opened and closed in the valve opening period EX1 and the valve opening period EX2.

(Specific Processing in Second Embodiment)

In the control of the first embodiment described above, control of the operating angle EX2 of the exhaust valve 28 corresponds to control of valve opening characteristics of the exhaust valve 28 that relates to the valve opening period EX2 that is performed to ensure the air amount Gair comes close to the stoichiometric requested air amount Gair_req during the response delay period $\tau_D'$ (intake-port-pressure decreasing period). In contrast, in the control example illustrated in FIG. 14 with respect to the second embodiment, control of the operating angle EX2 of the exhaust valve 82 and also control of the maximum lift amount thereof correspond to control of valve opening characteristics of the exhaust valve 82 that relates to the valve opening period EX2. Accordingly, although the specific processing if switching the operation modes accompanying two-time opening control of the exhaust valve in the present second embodiment may be fundamentally the same as the processing in the routine illustrated in FIG. 9 of the first embodiment described above, it is necessary to perform processing that calculates a requested operating angle EX2_req and a requested maximum lift amount of the exhaust valve 82 according to a previously defined map instead of the processing for calculating the requested operating angle EX2_req in step 118.

In the first and second embodiments, examples are described in which both of two exhaust valves 28 (or two exhaust valves 82) arranged with respect to the same cylinder are opened and closed in the valve opening period EX1 and the valve opening period EX2. However, exhaust valves driven to open and close in the valve opening period EX2 that corresponds to the second valve opening period in the present disclosure are not limited to all of a plurality of exhaust valves arranged with respect to the same cylinder, and may be any one of the plurality of exhaust valves. However, in this example, it is necessary to introduce EGR gas and adjust the air amount Gair by controlling valve opening characteristics, such as the operating angle of one exhaust valve. Consequently, with regard to an adjustment amount of the valve opening characteristics required to decrease the air by a certain amount, in an example of controlling the operating angle, it is necessary to increase the operating angle that corresponds to the adjustment amount in comparison to that when all of the exhaust valves are taken as a control object. Further, the number of exhaust valves provided with respect to the same cylinder is not limited to two as in the example of the exhaust valves 28 or 82, and may be one or three or more.

Furthermore, in the first and second embodiments, examples are described in which, based on the premise that the intake valve 26 opens at the exhaust top dead center, the closing timing EVC1 of the exhaust valves 28 or 82 is controlled to the exhaust top dead center in order to make zero the valve overlap period OL1 between the valve opening period EX1 and the valve opening period IN if executing two-time opening control of the exhaust valves 28 or 82. However, control for making the valve overlap period OL1 zero is not limited to control of the closing timing EVC1 of the exhaust valves 28 or 82. That is, a configuration may also be adopted in which an intake variable valve train is provided that is capable of changing the opening timing IVO of the intake valve 26, and the valve overlap period OL1 is made zero by performing control of the opening timing IVO instead of, or together with, controlling the closing timing EVC1. Further, depending on the configuration of the exhaust variable valve train of the internal combustion engine that is an object of the present disclosure, the closing timing EVC1 may be fixed without being taken as an object of variation. Further, adjustment of the valve overlap period OL1 for suppressing blow-through of intake air in the vicinity of the exhaust top dead center is not limited to controlling the valve overlap period OL1 to zero. For example, a configuration may also be adopted in which a so-called negative valve overlap period OL1 is set by opening the intake valve 26 at a timing that is later than the exhaust top dead center in the intake stroke while setting the closing timing EVC1 at the exhaust top dead center. Further, the negative valve overlap period OL1 may be set using a variable valve train if executing two-time opening control of exhaust valves, or may not be taken as an object of variation.

What is claimed is:

1. A control apparatus for an internal combustion engine, the internal combustion engine including:
   a fuel injection valve configured to supply fuel into the internal combustion engine;
   a turbo-supercharger including a compressor arranged in an intake passage and a turbine arranged in an exhaust passage;
   a waste gate valve configured to open and close an exhaust bypass passage that bypasses the turbine;
   an intake port being connected to the intake passage;
   at least one exhaust port being connected to of the exhaust passage; and
   an intake valve train configured to drive an intake valve that opens and closes the intake port;
   an exhaust variable valve train configured to drive at least one exhaust valve that opens and closes the at least one exhaust port; and
   wherein the at least one exhaust valve are provided with respect to a cylinder; and
   wherein the exhaust variable valve train is configured to:
      set a first exhaust variable valve opening period of the at least one exhaust valve including the at least one exhaust valve being open during an exhaust stroke of a piston and the at least one exhaust valve being closed when the piston reaches top dead center of the exhaust stroke
      set a second exhaust variable valve opening period of the at least one exhaust valve in which the at least one exhaust valve is opened and closed during an intake stroke that follows the exhaust stroke; and
      change exhaust valve variable valve characteristics including at least one of an opening timing, a closing timing, an operating angle, and a lift amount of the at least one exhaust valve in the second valve opening period;
   the control apparatus comprising a controller,
      the controller is programmed with executable instructions and stored in a non-transitory medium to:
      open the waste gate valve if switching operation modes is performed from supercharged lean burn operation in which combustion is performed at a lean air-fuel ratio greater than a stoichiometric air-fuel ratio with supercharging of intake air by the turbo-supercharger to stoichiometric burn operation in which combustion is performed at the stoichiometric air-fuel ratio, and if a requested air amount for the stoichiometric burn operation performed after the switching is less than a requested air amount for the supercharged lean burn operation performed before the switching;
      during an intake-port-pressure decreasing period in which intake port pressure decreases with respect to the waste gate valve having been opened during switching the operation modes,
      control the exhaust variable valve train to set the first exhaust variable valve opening period and the second exhaust variable valve opening period and at least a part of the second exhaust variable valve opening period to overlap with a valve opening period of the intake valve that opens at or after the piston reaches top dead center in an intake stroke;
      control the fuel injection to inject fuel of an amount required to achieve the stoichiometric air-fuel ratio under the requested air amount for the stoichiometric burn operation performed after the switching of the operation modes; and
      change the exhaust valve variable valve characteristics including the at least one of the opening timing, the closing timing, the operating angle, and the lift amount of the at least one exhaust valve that open and close in the second valve opening period to approach the requested air amount being supplied into the cylinder respectively.

\* \* \* \* \*